United States Patent Office.

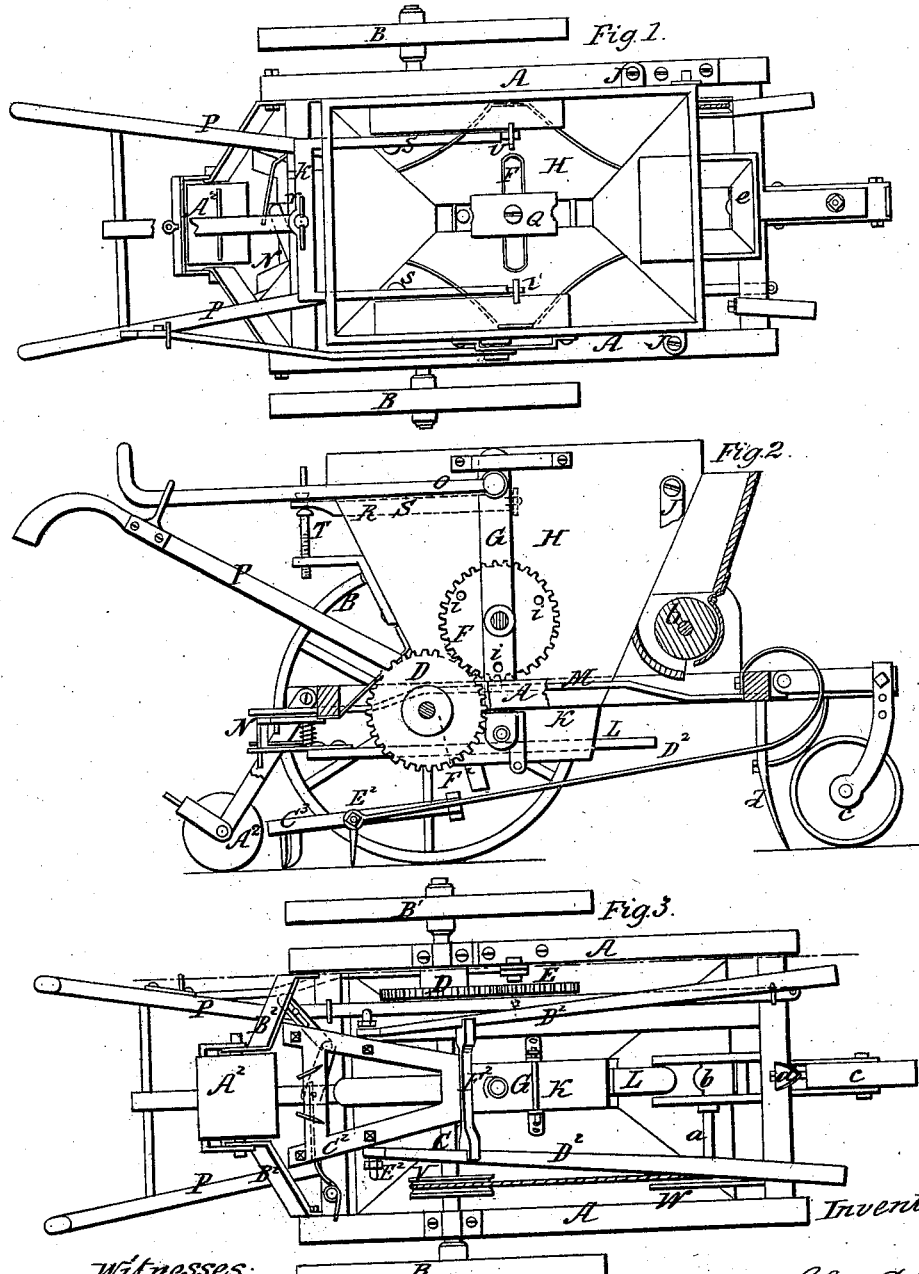

CHARLES C. GARRETT, OF DAYTON, ALABAMA.

Letters Patent No. 62,834, dated March 12, 1867.

---

IMPROVEMENT IN CORN AND COTTON-SEED PLANTER.

---

The Schedule referred to in these Letters Patent and making part of the same.

---

TO ALL WHOM IT MAY CONCERN:

Be it known that I, CHARLES C. GARRETT, of Dayton, in the county of Marengo, and State of Alabama, have invented a new and improved Cotton and Corn Planter and Harrow; and I do hereby declare that the following is a full, clear, and exact description thereof, reference being had to the accompanying drawings, forming a part of this specification.

The nature of my invention consists in so combining or constructing a machine by which cotton and corn may be planted in drills or hills at any desirable distance apart, and at the same time. It also consists in combining a harrow with the cotton and corn planter.

In strong bottom lands in Alabama it is usual to plant corn among cotton at a distance of twelve or fifteen feet apart, and my machine is peculiarly adapted to this purpose of planting cotton and corn in this manner, and at the same time. This I accomplish by an attachment to the cotton planter, in the bottom of the hopper of the planter, to plant corn. The distance between the hills is governed by the number of pintles in the side of the wheel, which is located at the side of the machine, which operates on a rod, one end of which acts on a bell-crank lever, the other end of which is attached to the slide in the corn planter, so that two, three, or more hills of corn will be dropped at every revolution of the wheel on which the machine runs.

To enable others skilled in the art to make and use my invention, I will proceed to describe its construction and operation.

Figure 1 is a top plan view of my improved cotton and corn planter.

Figure 2, a longitudinal vertical sectional elevation of the same from the line X X.

Figure 3 is a plan view from the bottom of the machine.

Letters of like name and kind refer to like parts in each of the figures.

A represents a rectangular frame made of wood, and of any suitable and convenient dimensions, mounted on wheels B B', which are of ordinary or common construction, and run on an axle C; the wheel B' being fast to the shaft or axle C, while the wheel B is allowed to run loose upon the said axle or shaft. D is a gear-wheel located and secured upon the axle C. The said gear-wheel meshes into and turns or drives a corresponding gear-wheel, E, which is secured to a shaft, F, which runs in a hanger, G, in which is a bearing for the said shaft F. This shaft F passes from the bearing in the hanger G through the hopper, in which the end of the said shaft also has a bearing. Upon this shaft F, and within the hopper I, is a seed cylinder, Q, which is provided with cells the size of which can be varied for the purpose of regulating the amount of seed desired to be deposited in a hill; this cylinder revolves with the shaft E. H is the seed hopper mounted on the top of the frame A, and supported in its position by the braces J J. Upon the under side of the seed hopper H is located a box, K, in which works the slide valve L, shown in dotted lines fig. 2. This slide valve L is worked back and forth by means of the pintles $i$, located in the gear-wheel E, fig. 2, engaging with the lever M that extends from end to end of the frame, and the rear end of the lever is attached or connected to the elbow-lever N, which connects with and works the slide valve L in the box K. O is a lever, connected to the hanger G, which extends back through a loop in one of the handles P, when it may be secured by a lug. This lever is for the purpose of throwing the gear-wheel E into and out of gear with the wheel D, so as to govern and control the action of the cylinder Q. R is a stirrup lever, the outer end of which is outside and at the rear end of the hopper. This lever R is hinged on pivot bolts S S, about midway of the arms of the lever, upon the inside of the hopper I, while to that portion of the lever outside of the hopper is attached an elevator screw T. The front ends of these arms of the lever R are connected to pendants U U that are attached to the shaft of the cylinder Q. On the axle C is a band-wheel V, around which a band passes and extends and works over the band-wheel W, which is located and secured upon the shaft $a$, upon which is also the seed cylinder $b$, the shaft of which runs in bearings fastened to the frame A. $c$ is a caster-wheel located underneath the pole just in front of the frame. This is hung in brackets in such a manner that its height may be adjusted to any desired position. $d$ is a plough or furrowing tooth secured to the front cross-piece of the frame. $e$ is a hopper at the front end of the hopper I, and over the cylinder $b$. $A^2$ is a roller which runs on journals that have bearings in the pendent stirrup $B^2$. This roller is for the purpose of rolling down the ground upon the seed after it has been planted by the machine, and at the same time or at the same operation. $C^2$ is a harrow, attached to the springs $D^2 D^2$, by means of a long bolt, $E^2$, and crosshead F². These springs extend forward and are secured to the front cross-piece of the frame. This harrow can be easily detached from the machine, when its use is not required, by simply removing the long bolt E². When it is desired to plant cotton and crop it with corn, the corn planter that is now on the bottom of the machine is removed by withdrawing the pin G², fig. 3, when it may be removed at once. The pintles are then removed from the side of the gear-wheel E, and the cylinder is then lowered by means of the screw T to the bottom of the hopper, at the same time leaving any number of the cells open in the cylinder $b$ so that corn may be planted as often as desired. It will be observed that there is a slot in the ends of the springs D² so that the springs may be stiffened by drawing them down in the bolts as circumstances may require.

Having thus described my invention, what I claim, and desire to secure by Letters Patent of the United States, is—

1. The stirrup lever R, connected to the cylinder Q, so that it can be raised and lowered substantially and for the purposes herein described.

2. I claim the stirrup lever R, and its connections with the seed cylinder Q, in combination with the lever O for the purposes and substantially as described.

3. I also claim the harrow C², and its means of attachment to the springs D² D², in connection with the seed planter, when constructed in the manner and for the purposes and substantially as described.

CHAS. C. GARRETT.

Witnesses:
    GEO. O. GARRETT,
    HENRY BRAME.